United States Patent
Salina et al.

(10) Patent No.: US 9,478,117 B2
(45) Date of Patent: Oct. 25, 2016

(54) SYSTEM AND METHOD FOR FINDING AN OBJECT AT DISTANCE

(76) Inventors: Jingming Li Salina, Bern (CH); Pascal Salina, Bern (CH)

( * ) Notice: Subject to any disclaimer, the term of this patent is extended or adjusted under 35 U.S.C. 154(b) by 0 days.

(21) Appl. No.: 14/406,418

(22) PCT Filed: Jun. 14, 2012

(86) PCT No.: PCT/EP2012/061281
§ 371 (c)(1),
(2), (4) Date: Dec. 8, 2014

(87) PCT Pub. No.: WO2013/185821
PCT Pub. Date: Dec. 19, 2013

(65) Prior Publication Data
US 2015/0170500 A1   Jun. 18, 2015

(51) Int. Cl.
*G08B 21/24*   (2006.01)
*G06K 7/00*   (2006.01)
*G08B 26/00*   (2006.01)

(52) U.S. Cl.
CPC ............ *G08B 21/24* (2013.01); *G06K 7/0008* (2013.01); *G08B 26/007* (2013.01)

(58) Field of Classification Search
CPC ... G08B 21/24; G08B 26/007; G06K 7/0008
See application file for complete search history.

(56) References Cited

U.S. PATENT DOCUMENTS

| | | |
|---|---|---|
| 5,804,810 A | 9/1998 | Woolley et al. |
| 2004/0046658 A1* | 3/2004 | Turner ............... G08B 21/0227 340/539.11 |
| 2004/0069851 A1 | 4/2004 | Grunes et al. |
| 2007/0273525 A1 | 11/2007 | Garber et al. |
| 2009/0160638 A1 | 6/2009 | Jesme |
| 2010/0019905 A1 | 1/2010 | Boddie et al. |
| 2010/0082485 A1 | 4/2010 | Lin et al. |

OTHER PUBLICATIONS

International Search Report dated Mar. 11, 2013 issued in corresponding International patent application No. PCT/EP2012/061281.

* cited by examiner

*Primary Examiner* — Leon Flores
(74) *Attorney, Agent, or Firm* — Ostrolenk Faber LLP

(57) ABSTRACT

A system and method for finding an object at distance, the system having a parent device (1) and at least one child device (2, 3, 4) that is attachable to or integratable into the object, wherein the parent device (1) and the child device (2, 3, 4) are adapted to communicate over a distance. In order to provide a better adaptability, in particular with respect to a selection of objects that shall be kept track of and combined with an improved object detectability, the invention suggests that the child device (2, 3, 4) has an identity memory (11) storing at least one identity code and the parent device (1) has an identity reader (10) for reading the identity code from the child device (2, 3, 4), an object memory (9) for storing the identity code, an object learner (5) configured with logic (7) to store the identity code in the object memory (9), and an object finder (6) configured with logic (8) to send a search signal to the child device (2, 3, 4) based on the identity code.

15 Claims, 3 Drawing Sheets

SYSTEM AND METHOD FOR FINDING AN OBJECT AT DISTANCE

CROSS REFERENCE TO RELATED APPLICATIONS

The present application is a 35 U.S.C. §371 National Phase conversion of PCT/EP2012/061281, filed Jun. 14, 2012, the disclosure of which is incorporated herein by reference. The PCT International Application was published in the English language.

TECHNICAL FIELD OF THE INVENTION

The present invention relates to a system and a method for finding an object at distance, the system comprising a parent device and at least one child device that is attachable to or integratable into the object, wherein the parent device and the child device are adapted to communicate over a distance.

BACKGROUND OF THE INVENTION

With growing prosperity, the average number of objects acquired per household increases. This makes it harder to keep things organized and it is not surprising that people often lose track of the location of their objects. A classic example is a misplacement of keys or other articles of daily use. The problem aggravates, when moveable objects are used by more than one person.

Current systems for finding an object at distance comprise one or more child devices attachable to the respective object(s). The child device has a receiver and a signal tone generator arranged inside a housing. The signal tone generator can be activated by a parent device adapted to transmit a radio signal to the receiver of the child device. Perceiving of the signal tone then allows the person to locate the whereabouts of the object.

A disadvantage of that object finding system is that the parent device can only be used to detect a limited number of objects that are associated with a predetermined number of child devices. Often, however, it would be desirable to keep track of yet another object and therefore to add another child device to be used for that object.

Another disadvantage is the limited detection range of that system due to the small covering range of the radio signal emitted from the parent device and also due to the locally restricted perceptibility of the signal tone generated by the child device, which only allows to find objects in close proximity to the parent device.

Other technologies currently used for finding of an object are based on a bluetooth or bluetooth low energy connection. These technologies make use of a defined "Find Me" profile, which enables an easy integration of a software application ("App") in a smartphone to find a gadget within the reach of the radio signal of bluetooth low energy. By pressing a button in the App of a smartphone, the gadget will trigger an alert. This approach, however, has two main shortcomings:

- One needs to configure the App of the smartphone with the MAC address of the gadget. However, the MAC address is not always available or visible or easy to be added to the App of a smartphone.
- It is only capable to find an object within the reach of the radio signal of Bluetooth Low Energy, typically within a 10 meters radius.

It is an object of the present invention to remedy at least one of the above mentioned deficiencies and to provide the initially addressed object finding system and method with a better adaptability, in particular with respect to a selection of objects that shall be kept track of, and/or with an improved object detectability, in particular with respect to the detection range and/or the ease of noticing an object's momentary location.

SUMMARY OF THE INVENTION

This object is achieved by the object finding system and the object finding method disclosed herein.

Accordingly, the invention proposes that the child device comprises an identity memory storing at least one identity code that is unique with respect to the identity code of other child devices and the parent device comprises an identity reader for reading the identity code from the child device, an object memory for storing the identity code read via the identity reader, an object learner configured with logic to store the identity code in the object memory based on the identity code reading of the identity reader, and an object finder configured with logic to send a search signal to the child device based on the identity code stored in the object memory.

Thus, the parent device of the object finding system according to the invention can provide an arbitrary monitoring of an optional number of uniquely identifiable child devices to be used for object location tracking, wherein the object learner and the object finder are exploited to advantageously share the object memory in which unique object identities corresponding to the identity codes of the respective child devices can be stored. Thereby, the identity reader and the object finder are preferably provided by distinct units that are adapted for operating independently from one another.

The unique identity associated with each object can provide an error-free object finding, even when more than one such a object finding system is applied in a certain detection region. Beyond that, the uniqueness of the identity code allows to prevent an undesired object tracking from a foreign parent device. Furthermore, the possibility of actively choosing the unique identities that shall be stored in the object memory can provide a high degree of user-friendliness combined with an unrestricted freedom of object management with respect to the objects in a person's household. The parent device according to the invention may be used to remember and find an individual object and/or to remember and find a group of objects each associated with a unique identity code of a child device.

The present invention further comprises a method for finding an object at distance, in particular in an object finding system according to the invention, comprising the steps of:
- providing the object with a child device containing a unique identity code;
- reading the identity code from the child device by a parent device and storing the identity code in a object memory of the parent device; and
- reading the identity code of the object from the object memory and sending a search signal to the child device based on the identity code.

Preferably, the method is implemented in a logical unit of the parent device and/or child device, in particular in a software application and/or firmware and/or hardware of the parent device and/or child device.

The following preferred aspects of the invention may be advantageously implemented in the object finding system and/or the object finding method.

Preferably, the unique identity of the child device stored in the identity memory can be read from the parent device via radio communication. More preferred, the identity memory of the child device is comprised in a near-field-communication (NFC) sender and the identity reader of the parent device is constituted by a near-field-communication (NFC) reader. Near field communication (NFC) constitutes a set of standards that can be used to establish radio communication between the two devices in proximity to each other. Preferably, the NFC sender is constituted by a NFC tag, in particular comprising a memory chip and a sending antenna, more preferred a passive antenna that is adapted to transmit the identity code to the NFC reader by a current induced from a transmission from the NFC reader.

In this way, a contactless data exchange of the unique identity code from the child device to the parent device can be realized in order to inform the parent device about the existence of the child device in a highly convenient manner. According to the invention, such a data exchange mechanism based on NFC technology can be implemented in a cost efficient manner. For the object finding, however, a more complex and safer communication is preferably established in between the parent device and the child device, which is then based on the identity code that has been previously exchanged.

Thus, the solution according to the invention preferably uses NFC technology for the parent device to remember an object to which a child device is attached or built-in. The child device preferably has a NFC tag to store an unique identity. The parent device preferably has a NFC reader. Preferably, when the parent device is getting sufficient close to the child device, it reads the unique identify associated to the object. The unique identity is preferably used to setup a more complex connection, in particular a connection for a wireless or a mobile radio system, to search the object.

Preferably, the child device has a NFC tag, which stores an identity that is used to setup a connectivity by a wireless or mobile communication system, e.g. a MAC address, an IPv4 address, an IPv6 address, a SIM identity etc. More generally, the child device may be a standalone device attachable to any object or an integrated part of a portable object or a mobile object like a phone, a camera, a bike, a car etc.

Preferably, the object finder of the parent device comprises a wireless and/or mobile communication system for sending the search signal to the child device. A corresponding wireless and/or mobile communication system is preferably provided in the child device. Thereby, the object finder is preferably configured to use the identity code stored in the object memory to setup a unique connection between the parent device and the child device via the wireless and/or mobile communication system. By establishing such a unique connection, an unambiguous identification of the searched object based on the associated identification code can be achieved.

Preferably, the respective wireless and/or mobile communication system comprises at least one of
  a bluetooth communication system, in particular including bluetooth low energy, preferably according to a bluetooth 4.0 standard or higher, and/or bluetooth, preferably according to a bluetooth 1.y, 2.y or 3.y standard or higher (with y representing an adequate specification number);
  a Wi-Fi-communication system, in particular including an IEEE 802.11x standard; and
  a mobile communication system, in particular including 2G and/or 3G and/or 4G generation standards or higher according to the ITU definition for the generation of mobile communication systems.

According to a first preferred configuration, the child device only comprises a single wireless and/or mobile communication system. More preferred, the single wireless and/or mobile communication system is constituted by a bluetooth communication system, most preferred a bluetooth low energy communication system. In this way, a small sized child device with a comparatively low energy consumption can be realized in a cost-efficient manner.

According to a second preferred configuration, the child device comprises multiple wireless and/or mobile communication systems. More preferred, the child device comprises at least two of a bluetooth communication system, a Wi-Fi-communication system, and a mobile communication system, in order to provide a higher detection reliability.

Accordingly, the object finder may comprise a single or multiple wireless and/or mobile communication systems. According to a particularly preferred configuration, the object finder comprises at least one bluetooth communication system, at least one Wi-Fi-communication system and at least one mobile communication system. In general, the employment of multiple communication systems for object finding can advantageously increase the detection reliability and can also provide a larger freedom in the design of the child device. In particular, various child devices with mutually different wireless and/or mobile communication systems can be provided, wherein the respective wireless and/or mobile communication systems may be selected to comply with a specific desired application area of the respective child device.

Moreover, the employment of multiple communication systems can allow to a account for varying detection criteria, in particular different detection distances in between the parent device and the child device. For this purpose, the object finder is preferably configured to activate each of the multiple wireless and/or mobile communication systems independent from one another and/or subsequent to one another. More preferred, the object finder is configured to subsequently activate the multiple wireless and/or mobile communication systems starting from the communication system with the lowest covering range to the communication system with the highest covering range. In this way, a rough estimation of the object's distance can be achieved and the object finding procedure can be advantageously matched with the estimated distance in order to provide a most convenient way for the user of retrieving the object.

Thus, the solution according to the invention preferably uses a wireless communication system and/or mobile communication system to find a memorized object placed in distance. A single or multiple wireless and/or mobile systems may be used depending on the search area. Preferably, when the parent device starts to search an object in the multiple radio case, the radio system with the shortest coverage distance is activated first, followed by a longer coverage distance radio system in a stepwise approach. More preferred, the object search is carried out in the following order: 1) Bluetooth low energy and/or Bluetooth; 2) Wi-Fi; 3) mobile system.

In particular, the parent device may comprise one or multiple wireless communication radio systems (Bluetooth low energy, Bluetooth, Wi-Fi) and/or one or multiple mobile communication radio. Correspondingly, the child device may have a single or multiple wireless communication radio (Bluetooth low energy, Bluetooth, Wi-Fi) and/or single or multiple mobile communication radio.

The logical configuration of the object learner and object finder of the parent device is preferably constituted by a single logical unit comprising associated logical components and/or program code or the like. Alternatively, the object learner and object finder may also be realized as separate logical units. In particular, the logical components of the object learner and object finder of the parent device are preferably constituted by respective hardware and/or firmware and/or software components. According to a preferred configuration, the parent device comprises a hardware and/or firmware running an application software, which purpose is first to remember an object associated with a child device and secondly to later find the corresponding object placed at distance.

Preferably, the child device comprises an alert generator, in particular a sound generator and/or a light generator and/or a vibration generator, that is configured to be activated after receiving of the search signal from the parent device. Alternatively or additionally, the child device preferably comprises a signal returner that is configured to transmit a finding signal to the parent device after receiving of the search signal. The finding signal preferably comprises information about the momentary location of the child device. A selection and application of one of the respective object finding provisions described above may be based on the user's convenience and/or preferences. An implemention of multiple object finding provisions, in particular an alert generator combined with a signal returner, can be further advantageous to increase the user's convenience and to allow a specific employment depending on various criteria such as the object's momentary distance to the parent device.

Preferably, the alert generator is configured to be activated when the distance between the parent device and the child device is below a threshold distance and/or the signal returner is configured to transmit the finding signal when said distance is above said threshold distance. Such a configuration can be particularly useful to allow the user fast retrieval of the object, when the object is in its direct area of access, and it can further allow a precise determination of the objects locality, in particular when the object is further apart from the user's access area.

For the latter purpose, the alert generator is preferably configured to be activated when the finding signal of one of the wireless and/or mobile communication systems has been received by the child device and the signal returner is preferably configured to send the finding signal when the finding signal of another of the wireless and/or mobile communication systems has been received by the child device.

According to a preferred configuration, the alert generator is configured to be activated when the finding signal of a bluetooth communication system has been received by the child device. In addition, the alert generator may also be configured to be activated when the finding signal of a Wi-Fi system has been received by the child device. On the other hand, the signal returner may be activated based on a Wi-Fi connection and/or a mobile connection that has been established between the parent device and the child device.

Thus, when the object is within a short distance (e.g. in a distance where a sound or sight can be perceived), the child device preferably generates an alert in sound or in other form like light or vibration. Beyond that distance, the child device preferably sends back the location of the object, which preferably is displayed on a map of the parent device's software application.

Preferably, in order to increase the usability of the object finding system, the parent device comprises a user interface for entering at least the following user commands:
  a remember command for instructing the object learner to read and store an identity code of a child device in the object memory; and
  a finding command for instructing the object finder to send a search signal to the child device.

More preferred, the following user commands are further comprised by the user interface:
  an adding command for instructing the object learner to increase the list of objects to be remembered in the object memory; and
  a deleting command for instructing the object learner to delete an object to be remembered and corresponding identity code of a child device from the object memory.

Preferably, the user interface also comprises a map for indicating the location of the child device. Moreover, the user interface preferably further comprises a list of memorized objects and/or an information output with respect to the progress of the object search.

In particular, a software application comprising the following fields may be included in the parent device:
  "Add me"-button;
  "Delete me"-button;
  "Remember me"-button;
  "Find me"-button;
  a list of memorized objects;
  a response field for the indication of the answers "Found!" or "Not yet found, search continues!" or "Not found!"; and
  an application map, indicating the location of the object when beyond the reach of the alert using the short distance search using bluetooth.

Preferably, the logical configuration of the child device is constituted by hardware and/or firmware components. According to a preferred configuration, the child device comprises an application, in particular in a firmware, which
  drives a periphery for generating the alert of sound, light, vibration, etc. when the associated object is found by the parent device and the distance to the parent device is inside a distance threshold value between the parent device and the child device; and/or
  sends a response with a location information used to indicate the object location at the application map on the parent device, when the distance to the parent device is beyond a distance threshold value between the parent device and the child device; and/or
  sends a response indicating the object has not been found, when the distance to the parent device is beyond a distance threshold value between the parent device and the child device.

The parent device and/or child device may be a stand-alone device or may be built into another device, e.g. an ICT user terminal device like a smartphone, a tablet etc. The child device may also be integrated into any portable or mobile object like a bike or a car, etc. Depending on the implementation, a device may also be both a parent device and a child device. According to this configuration of the object finding system, the parent device and the child device are preferably integrated in one single unit, wherein at least two of said units are provided. Preferably, in a standalone child device comprising only a bluetooth low energy or bluetooth communication system for object finding, the child device is in sleep mode, and is waken-up when the parent device starts a search.

The present invention also comprises a method for using the above described object finding system comprising at least one of the following steps:

"Add me":

Click the "Add me" button and give the object a name by typing a word, by taking a picture or by recording a voice phrase.

"Remember me":
a) Attach a child device to the object;
b) Move the parent device sufficiently close to the child device attached to or on the object;

"Find me" for a single object:
a) Select the object to-be-found in the memorized object list by clicking the name, the picture or by calling the name in voice.
b) Activate the find function by clicking the "Find me" button;
b1) When the object is within hearing or seeing distance, the child device generates an alert in sound or in light, or a vibration;
b2) When the object is beyond the reach of the short distance alert, a map will appear with an indication of the location of the object.

"Find me" for a group of objects:
a) Select the group of objects to-be-found;
b) Click the "Find me" button;
c) The found objects will be marked with a color or a symbol or an adequate sign.

The object finding system and method according to the invention can be advantageously applied in a multitude of application areas, some of which may comprise:

a) particularly with respect to a private usage, to find easily a misplaced object, like a key, a badge, a wallet, a pair of glasses, etc. and/or to find an object placed together with many other similar objects, like a bike or car, e.g. in a parking place, or luggage, e.g. on a transport carrier at the airport, etc., and/or to find a mobile or portable object like a pet, phone, laptop, bike, car, etc., b) particularly with respect a professional usage, to indicate and locate hotel room amenities, like a safe box, etc., and/or to locate a good in the inventory list of a retail store, like a book in a book store, etc., and/or to check the presence of goods in an inventory list, like books in a library, etc.

BRIEF DESCRIPTION OF THE DRAWINGS

The invention is explained in more detail hereinafter by means of preferred embodiments with reference to the drawings which illustrate further properties and advantages of the invention. The figures, the description, and the claims comprise numerous features in combination that one skilled in the art may also contemplate separately and use in further appropriate combinations. In the drawings:

DESCRIPTION OF EMBODIMENTS

Figure 1:
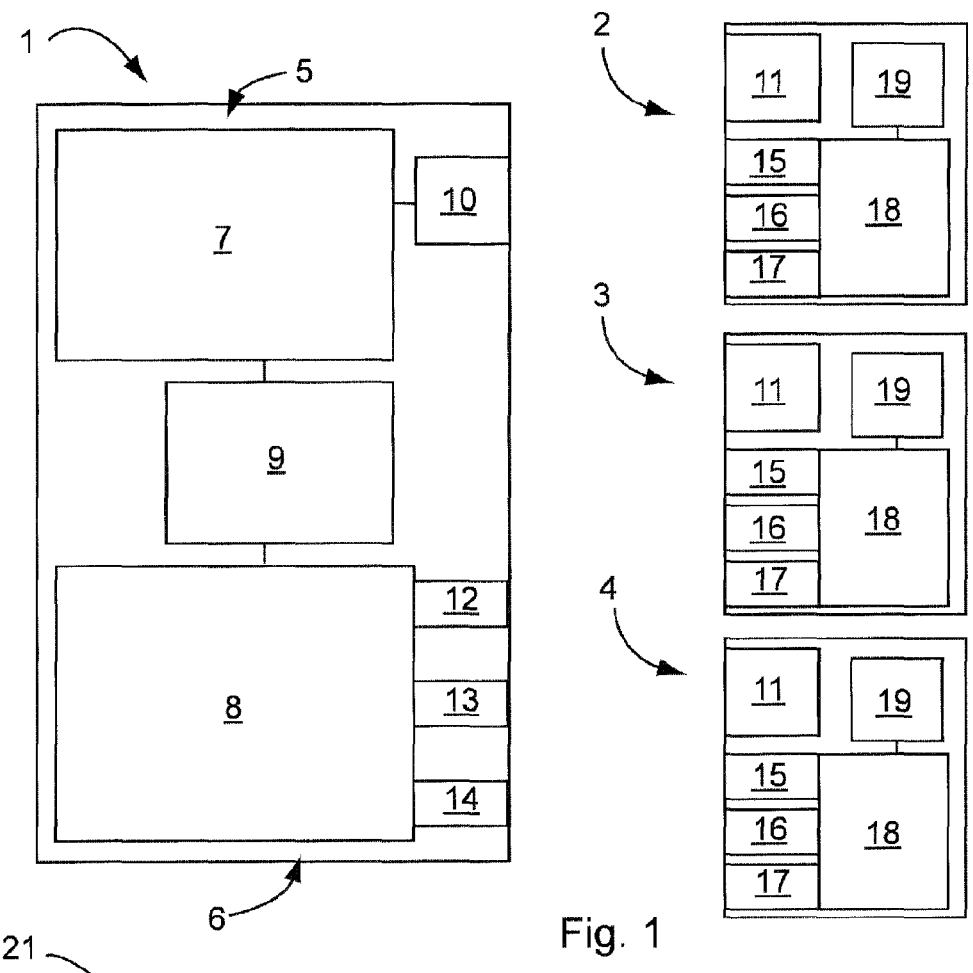
FIG. 1 is a schematic representation of an object finding system according to the invention.

FIG. 1 depicts a system for finding an object at distance comprising a parent device 1 and three child devices 2, 3, 4. Parent device 1 and child devices 2, 3, 4 are each arranged in a separate housing. Child devices 2, 3, 4 are adapted to be fixed to an object that shall be kept track off. Parent device 1 is adapted to be handled and transported by a user during his daily life. For instance, parent device 1 may be integrated in a mobile phone or other articles of daily use. Instead of an external fixation to an object, child devices 2, 3, 4 may not be contained inside an enclosure but may form an integrated part and/or electronic constituent of an object serving for another purpose, in particular a device or an object in which a Wi-Fi and/or mobile communication systems are provided, such as a smartphone, tablet or the like.

Parent device 1 comprises an object learner 5 and an object finder 6. Object learner 5 is provided with an object learning logic 7. Object finder 6 is provided with an object finding logic 8. In the specific example, object learning logic 7 and object finding logic 8 are constituted by a single software application that is installed and running on a hardware, respectively firmware, of parent device 1. Both, object learning logic 7 and object finding logic 8 are adapted to access an object memory 9 of parent device 1. Object learning logic 7 is further connected to an identity reader 10. Identity reader 10 is constituted by a near-field-communication (NFC) reader.

Each of the child devices 2, 3, 4 comprises an identity memory 11 constituted by an NFC tag. The NFC tag 11 comprises a memory chip and a passive sending antenna that is adapted to transmit data to the NFC reader 10 by a current that is induced by a previous transmission from the NFC reader. In the memory chip of the NFC tag 11, a unique identity code for each child device 2, 3, 4 is stored. The identity code can be, for instance, a MAC address, an IPv4 address, an IPv6 address, a SIM identity, etc., or a combination thereof.

Object learning logic 7 of parent device 1 is configured to read the identity code stored in identity memory 11 of a child device 2, 3, 4 via identity reader 10, when child device 2, 3, 4 is approached to parent device 1 within the reach of identity reader 10, such that a NFC connection can be established, and to subsequently store the identity code in object memory 9. In this way, parent device 1 is provided with the functionality to learn about the existence of child device 2, 3, 4 and therefore also of an object associated with child device 2, 3, 4.

Object finder 6 of parent device 1 further comprises three communication systems 12, 13, 14 adapted for sending a search signal to child devices 2, 3, 4. In each child device 2, 3, 4, corresponding communication systems 15, 16, 17 adapted for receiving the respective search signal from the parent device 1 are provided. First communication systems 12, 15 are constituted by a wireless communication system in the form of a bluetooth low energy or bluetooth communication system. Second communication systems 13, 16 are constituted by a wireless communication system in the form of a Wi-Fi communication system satisfying an IEEE 802.11x standard. Third communication systems 14, 17 are constituted by a mobile communication system of a 2G, 3G or 4G generation standard.

Object finding logic 8 of parent device 1 is configured to read the identity code of a desired child device 2, 3, 4 or a group of desired child devices 2, 3, 4 from object memory 9. Object finding logic 8 is further configured to send a search signal based on the read identity code or identity codes via search communication systems 12, 13, 14. Thereby, a step-like approach is applied starting from the communication system 12, 13, 14 with the lowest transmission range to the communication system 12, 13, 14 with the highest transmission range.

More particular, transmission starts with bluetooth low energy or bluetooth communication system 12 having the lowest transmission range. In case a connection based on the respective identity code(s) read from object memory 9 can be established via corresponding communication system 15 of a desired child device 2, 3, 4, the other communication systems 13, 14 are not further exploited. Object finding logic 8 takes note of this situation as an "object found" event.

In the contrary case in which no such bluetooth connection can be established, the transmission of parent device 1 is continued with Wi-Fi communication system 13, representing a medium transmission range. If a respective connection with communication system 16 of desired child device 2, 3, 4 can be established, the further communication system 14 is not used. Object finding logic 8 takes note of this situation as an "object found" event.

Otherwise, if also no Wi-Fi connection based on the respective identity code can be established, the transmission of parent device 1 is continued with mobile communication system 14, representing the largest transmission range. If the mobile connection can be set-up, object finding logic 8 takes note of this situation as an "object found" event. If no connection via mobile communication system 14 based on the respective identity code can be established either, object finding logic 8 takes note of this situation as an "object not found" event.

Each of child devices 2, 3, 4 comprises a receiving logic 18 implemented as a firmware in child device 2, 3, 4. Receiving logic 18 is connected to all three communication systems 15, 16, 17 of respective child device 2, 3, 4. Moreover, each child device 2, 3, 4 is provided with an alert generator 19 that is also connected to receiving logic 18. Alert generator 19 comprises a tone generator. Alternatively or additionally, alert generator 19 may be provided with a light emission source and/or a vibrator and/or other means allowing a sensual perception of the object in close proximity thereof.

In case a connection with parent device 1 can be established via bluetooth low energy or bluetooth communication system 15, indicating that child device 2, 3, 4 is not very far out of reach, alert generator 19 is activated via the respective receiving logic 18. This allows the user to immediately notice the location of the searched object in his surrounding area. In case a connection with parent device 1 can only be established via Wi-Fi communication system 16 or mobile communication system 17, alert generator 19 is not activated, since child device 2, 3, 4 is out of the user's perception range of alert generator 19 with respect to the location of parent device 1.

Moreover, at least in the cases a connection in between Wi-Fi communication systems 13, 16 or mobile communication systems 14, 17 can be established, respective child device 2, 3, 4 sends localization information to parent device 1, allowing to visualize the location of respective child device 2, 3, 4 on a map of parent device 1.

Figure 2:
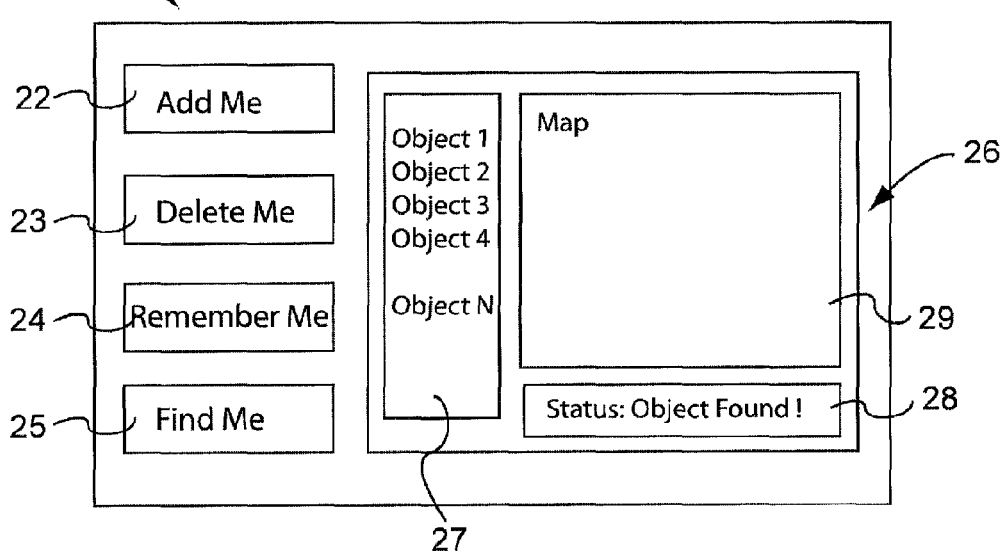
FIG. 2 is a schematic representation of user interface for an object finding system according to the invention.

FIG. 2 depicts a user interface 21 of parent device 1 allowing a user to interact with parent device 1. User interface 21 comprises four push buttons 22, 23, 24, 25 each allowing to enter a command into parent device 1. Moreover, user interface 21 comprises a display 26 subdivided into three screens 27, 28, 29. First screen 27 is an object display screen showing a name of all objects that are memorized in object memory 9. Second screen 28 is a status screen displaying the momentary status of the object search to be carried out. Third screen 29 is a map screen adapted to geographically indicate the location of an object after a respective object search has been carried out successfully.

First push button 22 is an "Add me"-button, allowing to extend the list of objects memorized in object memory 9 and displayed on object display screen 27. Adding of a new object can be accomplished by typing of an object name and/or taking of an object picture and/or recording an object name by voice phrases. Second push button 23 is a "Delete me"-button, allowing to remove an object from the list of objects memorized in object memory 9 and displayed on object display screen 27.

Third push button 24 is a "Remember me"-button, allowing to read the identity code stored in NFC tag 11 of child device 2, 3, 4, when respective child device 2, 3, 4 is in the vicinity of NFC reader 10 of parent device 1, and to store the identity code in object memory 9, wherein the identity code is assigned to a respective object that has been added via "Add me"-button 22.

Fourth push button 25 is a "Find me"-button, allowing to select an object or a group of objects to be searched from the object list displayed on object display screen 27 and to subsequently activate communication systems 12, 13, 14 in order to find the respective object(s).

Figure 3:
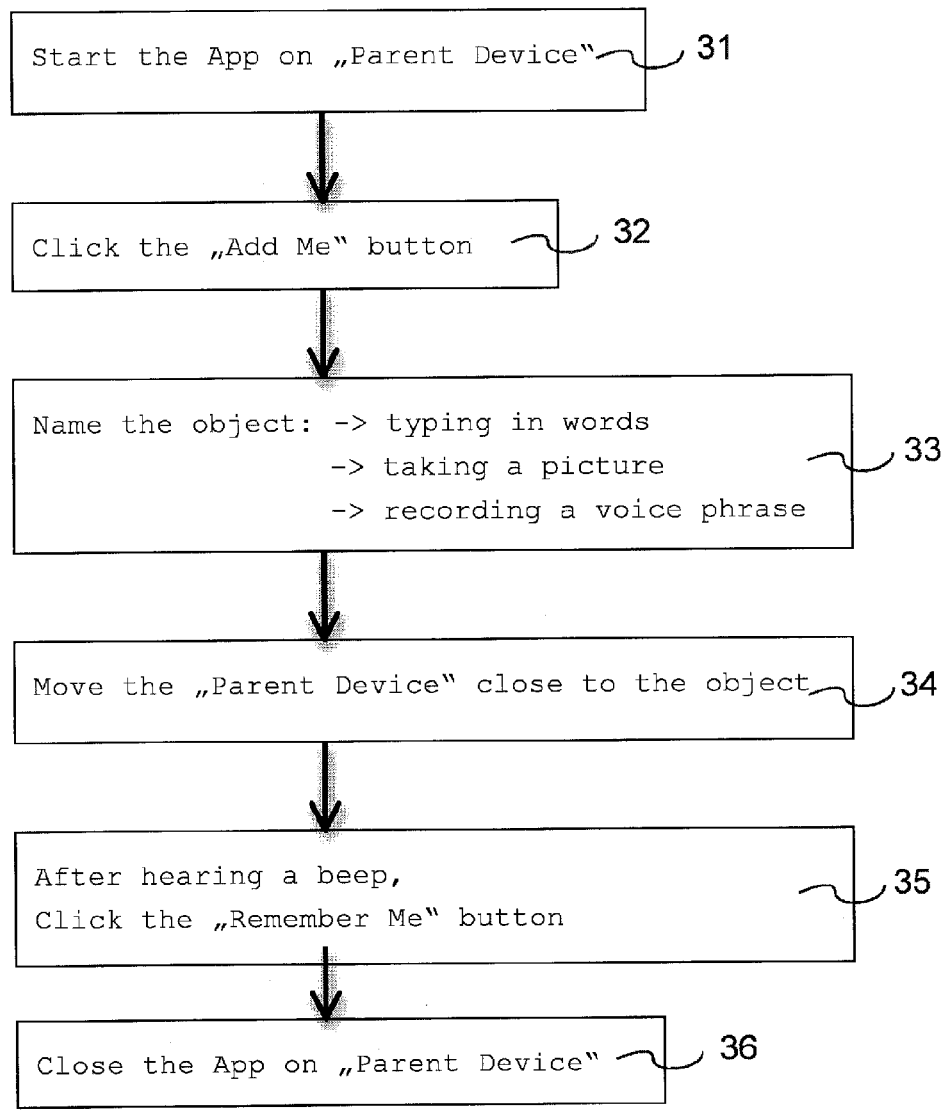
FIG. 3 is a flow diagram of a method for remembering a child device and associated object in an object finding system according to the invention.

The flow diagram shown in FIG. 3 illustrates the subsequent steps that are carried out to memorize an object in a "Remember me"-procedure. In a first step 31, the software application is launched on parent device 1. In a second step 32, the "Add Me"-button 22 is pushed, followed by a third step 33 of providing a recognizable name or symbol by typing, taking a picture, recording a voice phrase, or the like.

In a fourth step, parent device 1 and child device 2, 3, 4 associated with the respective object are moved sufficiently close together, such that an NFC connection between NFC reader 10 and NFC tag 11 can be established. The successful set-up of the NFC-connection is indicated by a signal tone in a fifth step, in which the "Remember me" button is pushed to instruct object learner 5 of parent device 1 to read the identity code of child device 2, 3, 4 and store it in object memory 9. This terminates the "Remember me"-procedure and the software application can be closed in final step 36.

Figure 4:
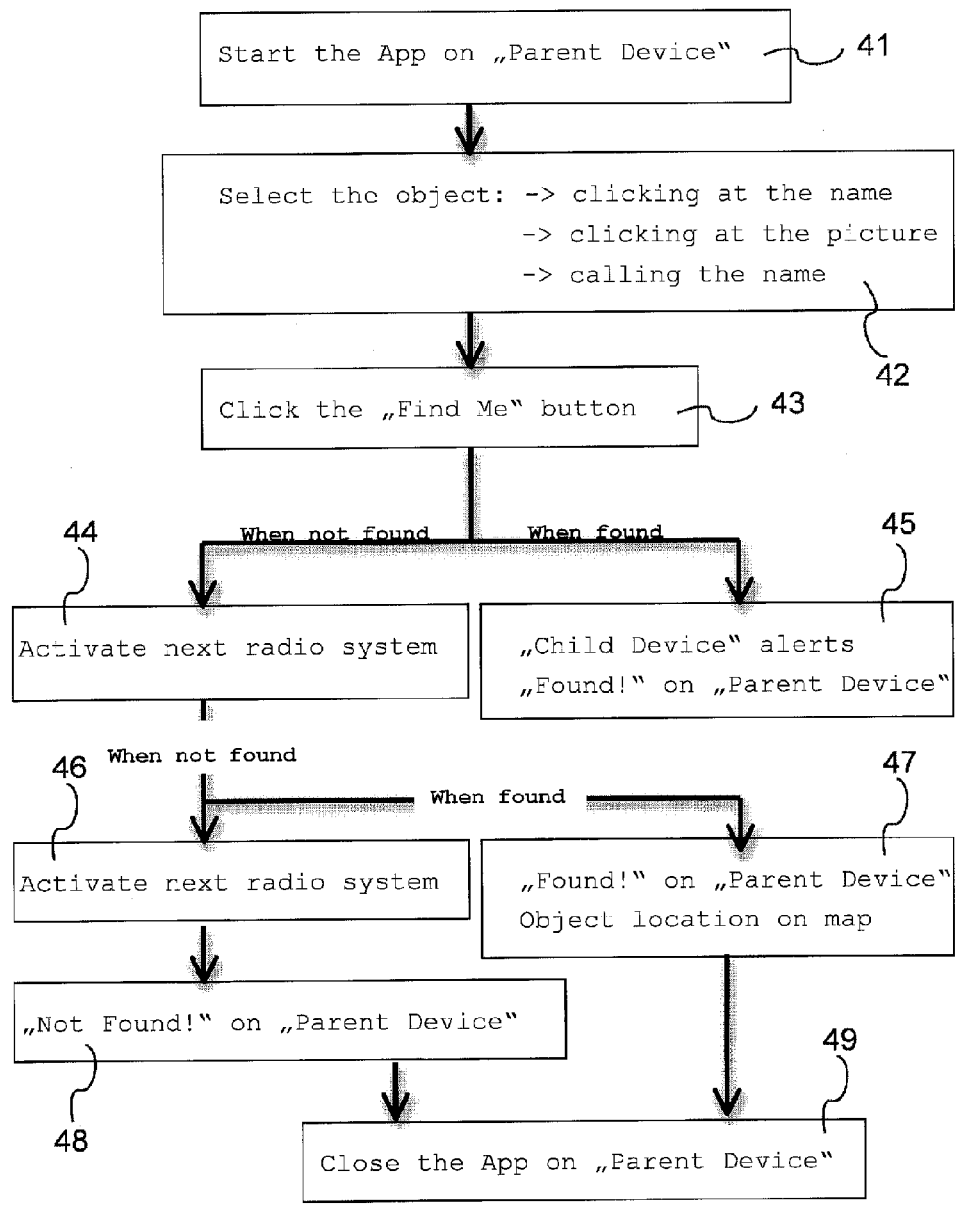
FIG. 4 is a flow diagram of a method for finding a child device and associated object in an object finding system according to the invention.

FIG. 4 depicts a flow diagram of a "Find Me"-procedure illustrating the subsequent steps that are carried out to search for an object or for a group of objects. In a first step 41, the software application is started on parent device 1. In a second step 42, the object or the group of objects to be searched for is selected by clicking on the respective object representation(s) on object display screen 27 or by calling the respective name of the object(s).

The object search is then initiated in a third step 43 of clicking "Find me" button 25. This will activate first communication system 12 on parent device 1 which is trying to set up a connection with corresponding first communication system 15 of child device 2, 3, 4 based on the identity code read from object memory 9. If a connection based on the identity code can be established with child device 2, 3, 4 of the searched object or group of objects, the following step 45 comprises an activation of alert generator 19 of respective child device 2, 3, 4 and the output of an "Object found" message on status screen 28 of parent device 1.

If such a connection via respective first communication systems 12, 15 of parent device 1 and child device 2, 3, 4 based on the read identity code associated with the searched object(s) cannot be established, the following step 46 comprises an activation of the second communication system 13 with a higher covering range on parent device 1. If then a connection based on the identity code can be established with the corresponding second communication system 16 of the searched child device(s) 2, 3, 4, the following step 47 comprises a sending of location information from child device(s) 2, 3, 4 to parent device 1 via the established connection and an output of the object location on map screen 29 of parent device 1, together with an "Object found" message on status screen 28.

If the connection via respective second communication systems 13, 16 based on the read identity code cannot be established either, the preceding steps 44, 46 and 47 are repeated with communication systems 14, 17 of the next higher covering range, until all available communication systems 12, 13, 14, 15, 16, 17 have been exploited. If, in the end, no connection at all between communication systems 12, 13, 14, 15, 16, 17 could be established, it results in the output of an "Object not found" message on status screen 28 of parent device 1 during subsequent step 48. After the end of the object search, the application software can be closed in final step 49.

Overall, a solution has been described for finding an object at distance by pairing devices, utilizing NFC technology and wireless and/or mobile communication systems. The pairing devices are composed of parent device 1 and child device 2, 3, 4. One parent device 1 can have as many child devices 2, 3, 4 as needed.

The solution uses NFC technology for parent device 1 to remember an object to which child device 2, 3, 4 is attached or built-in. Child device 2, 3, 4 has NFC tag 11 to store an unique identity. Parent device 1 has NFC reader 10. When parent device 1 is getting sufficient close to child device 2, 3, 4, it reads the unique identity associated with the object. The unique identity is then memorized by an App running on parent device 1 under a given name of the object. The unique identity is used for setting up a wireless connection to search the object. When multiple radio systems are used and if they use different identities for setting up wireless connections, multiple identities are stored in NFC tag 11 of child device 2, 3, 4.

The solution uses wireless and/or mobile communication systems 12, 13, 14, 15, 16, 17 to find a memorized object placed at distance. A single or multiple wireless and mobile systems can be used depending on the search area. In multiple radio case, when parent device 1 initiates the searching of an object, the radio with the shortest coverage distance is activated first, followed by a longer coverage distance radio system in a stepwise approach. When the object lays within hearing or seeing distance, child device 2, 3, 4 generates a physical alert using acoustic vibration (sound/beep) or other form such as light or mechanical vibration. Beyond hearing or seeing distance, child device 2, 3, 4 sends back the location information of the object (coordinates or similar), which is displayed on a map of the App (software) running on parent device 1.

Both parent device 1 and child device 2, 3, 4 can be a standalone device or can be built into another device e.g. an ICT user terminal device like smartphones, Tablets etc. Child device 2, 3, 4 can also be integrated into any portable or mobile object like a bike or a car, etc. Depending on the implementation, a device can also be both a parent device 1 and a child device 2, 3, 4.

Thus, the present invention is a solution of firstly pairing parent device 1 and child device 2, 3, 4 using NFC to read an object and using App to memorize it; and secondly to find the memorized object placed at distance using wireless and/or mobile communication systems 12, 13, 14, 15, 16, 17 in the following order: 1) Bluetooth low energy or Bluetooth; 2) Wi-Fi; 3) mobile system (2G or 3G or 4G).

The present solution according to the invention of pairing devices 1, 2, 3, 4 allows to overcome the shortcomings of prior art devices, in particular by:

Using NFC technology for parent device 1 to easily learn an object associated to child device 2, 3, 4, where:
a) Child device 2, 3, 4 has embedded NFC tag 11 storing a unique identity like a MAC address, an IPv4 address, an IPv6 address or a SIM identity, etc. The stored unique identity is used by a wireless or a mobile system for setting-up a connection to search an object. If multiple radio technologies are used and they use different identity to setup a connection, multiple identities are stored in NFC tag 11 of child Device 2, 3, 4.
b) Parent device 1 has embedded NFC reader 10 to learn the object by reading the unique identity(ies) of child device 2, 3, 4 associated to the object.

Using Wireless and/or Mobile systems, available at both parent device 1 and child device 2, 3, 4, to find a memorized object placed at distance.
a) When only bluetooth low energy or bluetooth is used, child device 2, 3, 4 can be small sized and light weighted, with a very low energy consumption. It can be simply attached to an easy to loose object like a pair of glasses, a wallet etc.
b) When multiple wireless & mobile radios are available, the object search follows a stepwise approach, i.e. first, the shortest radio range like Bluetooth Low Energy or Bluetooth is activated, then Wi-Fi and finally a mobile radio link (2G, 3G or 4G). This makes special sense when parent device 1 and child device 2, 3, 4 are built in a device or in an object which has a Wi-Fi and/or mobile communication systems.

From the foregoing description, numerous modifications of the object finding system and method according to the invention are apparent to one skilled in the art without leaving the scope of protection of the invention that is solely defined by the claims.

What is claimed is:

1. A system for finding an object at distance comprising a parent device and at least one child device that is attachable to or integratable into the object, wherein the parent device and the child device are adapted to communicate over a distance,
wherein the child device comprises an identity memory storing at least one identity code that is unique with respect to the identity code of other child devices, and the parent device comprises an identity reader for reading the identity code from the child device,
an object memory for storing the identity code read via the identity reader, an object learner configured with logic to store the identity code in the object memory based on the identity code reading of the identity reader, and an object finder configured with logic to send a search signal to the child device based on the identity code stored in the object memory;
wherein the identity memory is comprised in a near-field-communication sender and the identity reader is comprised in a near-field-communication reader,
wherein the object finder comprises a wireless and/or mobile communication system comprising at least one of a bluetooth communication system, a Wi-Fi-communication system, and a mobile communication system for sending the search signal to the child device, and
wherein the parent device comprises a user interface that is operable for entering at least the following user commands:

a remember command for instructing the object learner to read and store an identity code of a child device in the object memory; and a finding command for instructing the object finder to send a search signal to the child device.

2. The system according to claim 1, wherein the object finder is configured to use the identity code stored in the object memory to setup a unique connection between the parent device and the child device via the wireless and/or mobile communication system.

3. The system according to claim 1, wherein the object finder comprises multiple wireless and/or mobile communication systems.

4. The system according to claim 3, wherein the object finder is configured to activate each of the multiple wireless and/or mobile communication systems subsequent to one another.

5. The system according to claim 4, wherein the object finder is configured to subsequently activate the multiple wireless and/or mobile communication systems starting from the communication system with the lowest covering range to the communication system with the highest covering range.

6. The system according to claim 3, wherein the child device comprises an alert generator that is configured to be activated after receiving of the search signal, wherein the alert generator is configured to be activated when the finding signal of a bluetooth communication system has been received by the child device.

7. The system according to claim 3, wherein said multiple wireless and/or mobile communication systems comprise a bluetooth communication system, and/or a Wi-Fi-communication system and/or a mobile communication system.

8. The system according to claim 1, wherein the child device comprises an alert generator that is configured to be activated after receiving of the search signal.

9. The system according to claim 8, wherein the child device comprises a signal returner that is configured to transmit a finding signal to the parent device after receiving of the search signal and the alert generator is configured to be activated when the distance between the parent device and the child device is below a threshold distance and/or the signal returner is configured to transmit the finding signal when said distance is above said threshold distance.

10. The system according to claim 8, wherein the alert generator is a sound generator and/or a light generator and/or a vibration generator.

11. The system according to claim 1, wherein the child device comprises a signal returner that is configured to transmit a finding signal to the parent device after receiving of the search signal.

12. The system according to claim 11, wherein the finding signal comprises information about the location of the child device.

13. The system according to claim 1, wherein the user interface comprises a map for indicating the location of the child device.

14. A method for finding an object at distance, in an object finding system according claim 1, comprising the steps of:
providing the object with a child device containing a unique identity code;
reading the identity code from the child device by a parent device and storing the identity code in an object memory of the parent device; and
reading the identity code of the object from the object memory of the parent device and sending a search signal to the child device based on the identity code.

15. A system for finding an object at distance comprising a parent device and at least one child device that is attachable to or integratable into the object, wherein the parent device and the child device are adapted to communicate over a distance,
wherein the child device comprises an identity memory storing at least one identity code that is unique with respect to the identity code of other child devices, and the parent device comprises an identity reader for reading the identity code from the child device,
an object memory for storing the identity code read via the identity reader, an object learner configured with logic to store the identity code in the object memory based on the identity code reading of the identity reader, and an object finder configured with logic to send a search signal to the child device based on the identity code stored in the object memory;
wherein the object finder comprises multiple wireless and/or mobile communication systems for sending the search signal to the child device; and
wherein the child device comprises an alert generator that is configured to be activated after receiving of the search signal,
wherein the child device comprises a signal returner that is configured to transmit a finding signal to the parent device after receiving of the search signal,
wherein the alert generator is configured to be activated when the finding signal of one of the wireless and/or mobile communication systems has been received by the child device, and
wherein the signal returner is configured to transmit the finding signal when the finding signal of another of the wireless and/or mobile communication systems has been received by the child device.

* * * * *